INVENTORS.
Shiro Takahashi
Masataka Ichinose
BY: Kelman and Berman

AGENTS

United States Patent Office 3,740,208
Patented June 19, 1973

3,740,208
METHOD AND APPARATUS FOR FORMING CONTINUOUS SHEETS OF GLASS
Shiro Takahashi and Masataka Ichinose, Kitakyushu, Japan, assignors to Asahi Glass Co., Ltd., Tokyo, Japan
Filed Oct. 20, 1970, Ser. No. 82,442
Claims priority, application Japan, Nov. 6, 1969, 44/88,392
Int. Cl. C03b 15/06
U.S. Cl. 65—90                    6 Claims

ABSTRACT OF THE DISCLOSURE

Method and apparatus for producing sheet glass by the vertical drawing of molten glass are described. The apparatus comprises a pair of rotatable drawing elements partially submerged in a bath of molten glass, and the glass is drawn up in the form of a ribbon through a slit between said drawing elements.

BACKGROUND OF THE INVENTION

(1) Field of the invention

This invention relates to the manufacture of sheet glass and, more particularly, to a novel method and apparatus for the production of glass sheet, said method and apparatus being improvements over the so-called Fourcault process which comprises drawing a continuous ribbon of molten glass through a slit in a debiteuse which is partially submerged in a molten glass bath contained in a glass drawing chamber.

(2) Description of prior art

In the Fourcault process which is an established method of forming continuous sheet glass, glass is drawn upwards in the form of a ribbon through a slit in a debiteuse made of refractory material which is partially submerged in a molten glass bath contained in a drawing chamber. According to this process, the debiteuse referred to above has the advantage that it makes for a more uniform thickness distribution in the sheet glass ribbon being drawn, as well as the advantage that it facilitates sheet glass forming control. However, the process is disadvantageous in that because of the proximity between the glass ribbon forming temperature and the devitrifying temperature of glass, there are inevitably formed devitrification stones in the neighborhood of the slit and, as a result, linear waves known as "Fourcault lines" are often produced on the surface of the glass ribbon drawn. For this reason, the drawing operation must be suspended every 7 to 10 days in order to remove the devitrification stones formed on the debiteuse near its slit.

Thus, the sheet glass formed by the Fourcault process has as its characteristic defects the aforesaid Fourcault lines and the open seeds on and near the surface which are caused by the gas evolved from the debiteuse upon interruption of the drawing operation under hot conditions. In addition, the molten glass introduced into the drawing chamber erodes the slit zone of the debiteuse and this localized corrosion and erosion necessitate periodic debiteuse replacements.

This not only represents an addition to glass production cost but also leads to a reduction in production efficiency due to the increased incidence of open seeds after each debiteuse replacement.

Our detailed study of the progress and pattern of devitrification on the debiteuse around its slit in the Fourcault process led to the finding that under certain condiitons, devitrification occurs even in the core portion of molten glass mass at both edges of the slit but it is not a crucial determinant of the magnitude of Fourcault lines and, consequently, of the operation cycle and that, rather, the band of devitrification stones which grows significantly on the debiteuse near the meniscus of glass has a crucial influence upon the magnitude of Fourcault lines that are produced in the Fourcault process.

Though not a few attempts have heretofore been made to remove the devitrification stones formed on the debiteuse near the slit zones by thermal or mechanical means, none of the attempts have been conducive to satisfactory results.

SUMMARY OF THE INVENTION

It is therefore a principal object of this invention to provide a new method and apparatus for the production of sheet glass, which are free from the foregoing intrinsic drawbacks of the Fourcault process, and retain the merits of the same process.

In accordance with the invention, the conventional debiteuse of the Fourcault process is replaced with a pair of rotatable elements disposed in mutually parallel relation and in such a proximity as to define a slit therebetween, said elements being partially submerged in the molten glass bath. In operation, as a sheet glass ribbon is drawn up through said slit, the pair of rotatable elements are driven at a low speed and in mutually opposite directions so as to present constantly renewed surfaces to the glass ribbon being formed and, accordingly, eliminate the defects which have heretofore been inevitable as the result of said devitrification. In addition, the invention employs eccentric rotatable elements to adjust the thickness of the sheet glass ribbon being drawn, thus enabling one to produce glass sheets of diverse thicknesses with the use of rotatable elements of only one selected type.

Figure 1:
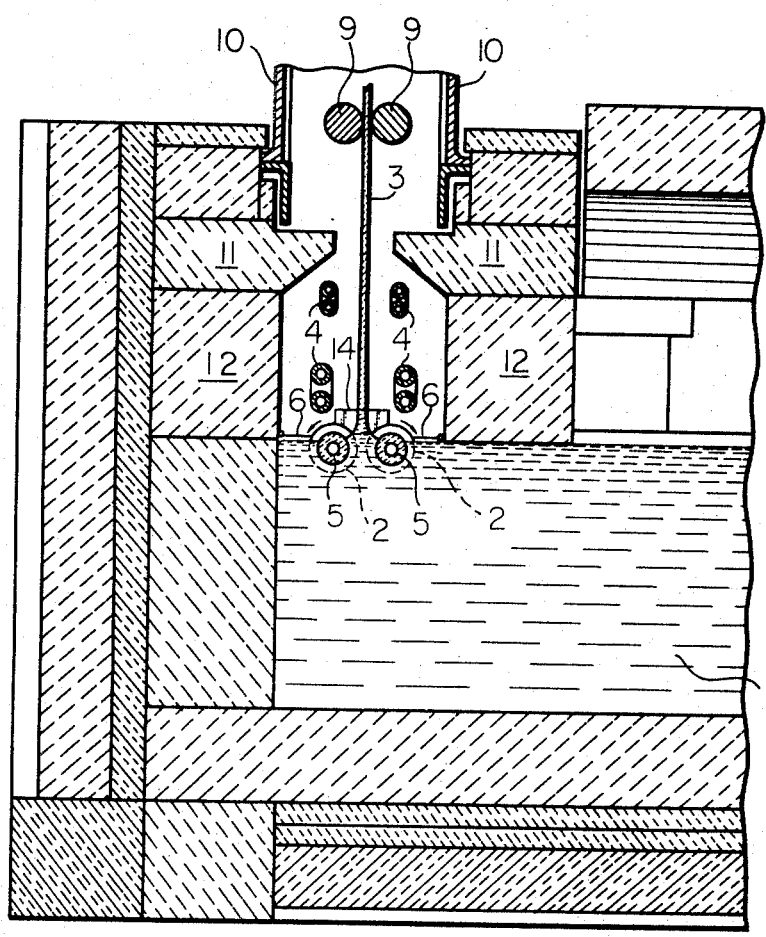
FIG. 1 is a sectional, elevational view showing the drawing chamber of a glass drawing apparatus embodying the principles of the invention.
Figure 2:
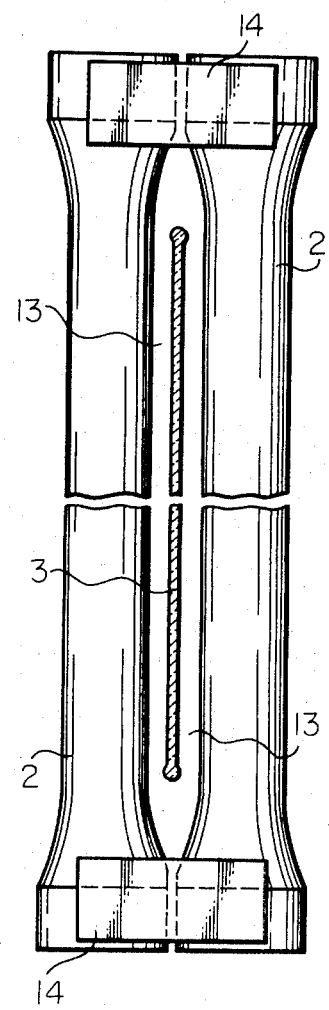
FIG. 2 is a plan view showing a pair of rotatable elements as installed in the drawing chamber illustrated in FIG. 1.

Referring, now, to FIG. 1, a pair of rotatable elongated elements 2 are partially submerged in a molten glass bath 1 contained in a drawing chamber which is defined by refractory blocks 11 and 12. A slit 13 is bounded by said pair of rotatable elements 2 and the glass is vertically drawn up through said slit 13, in which process it is formed into a continuous ribbon 3. The thus-drawn glass ribbon 3 is cooled by water-cooled pipes 4 disposed on both sides thereof and drawn further up by drawing rollers 9 installed in a drawing machine housing 10 above the drawing chamber. Each of the rotatable elements 2, as illustrated in FIG. 2, is a bar-shaped element of circular cross-section which is made of refractory material. However, it is somewhat reduced in thickness in the central portion and enlarged at both ends. Each rotatable element 2 can be rotated about its central axis at a low speed in the direction of the arrow (see FIG. 1).

On the surface of each drawing element 2 adjacent the base or meniscus of the glass ribbon being drawn, there is the tendency of devitrification stones being formed in the course of, but as the drawing elements 2 rotate, the stones are removed from the meniscus and prevented from marring the glass ribbon. The diameter of each rotatable element is, for example, about 150 millimeters as measured at the center, and about 250 millimeters at the end.

The rotatable elements 2 are partially submerged in the molten glass bath 1, with the drive shaft 5 of each element being set about 15 millimeters below the level of the bath.

Adjacently over the molten glass bath in the drawing chamber, there are disposed screen plates 6, which are made of heat-resisting material such as, for example, stainless steel.

The plates serve to keep warm the elements 2 in order to ensure a smooth revolution of the elements and assist in the suppression of formation of devitrification stones on the surfaces of the elements and in the remelting of the stones when the stones are submerged in the molten glass as the elements rotate.

To maintain the surface temperature of the elements 2 within the proper range, an electrical heating coil (not shown) may be set within the bore of each drive shaft 5.

Figure 3:
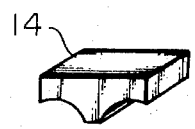
FIG. 3 is a perspective view showing a typical edge block which is to be mounted on both ends of the rotatable elements.
Figure 4B:
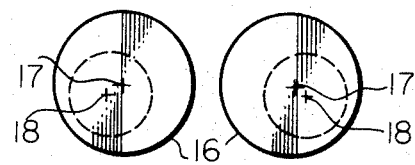
FIG. 4(b) is a front elevation of the rotatable elements illustrated in FIG. 4(a)

In FIG. 3 is shown an edge block 14 made of refractory material which rests on the rotatable elements 2 near their ends. These edge blocks serve to adjust the width of the glass ribbon being drawn and smoothen the edge of the ribbon.

As shown in FIG. 2, the slit 13 is defined by the two parallel rotatable elements 2 and corresponds to the slit in the dibiteuse used in the Fourcault process.

Thus, the portions of the slit corresponding to the edge or selvage portions of the glass ribbon are made narrower and the width of the slit in its central zone is relatively large because of the reduced diameter of the rotatable elements in this region.

In the production of sheet glass according to this invention, there also are formed devitrification stones on the rotatable elements with the progress of drawing, but those devitrification stones are moved outwardly of the slit 13 as the elements rotate, thereby allowing each element to present a non-devitrified, clean surface adjacent the meniscus, that is to say, in the area which plays a role of paramount importance in the formation of sheet glass.

The rotatable elements are driven at a very low speed in an upwardly and outwardly direction with respect to the slit 13, generally at a peripheral speed of a few millimeters to a few revolutions per day and, for most practical purposes, at a peripheral speed of 0.1 millimeter to 5 millimeters per day as measured at the end portions thereof. This speed is an insignificantly small fraction of the speed at which the glass is drawn by the rollers 9. With the revolution of the elements 2, the devitrification stones formed in the meniscus zone are carried into the bath and away from the glass ribbon being drawn, and sink to the bottom of the drawing chamber.

However, because of the extremely low rotational speed of the elements, the devitrification stones are remelted in the molten glass, and even after the elements have passed through a full revolution, the glass being drawn will not be adversely affected by the stones.

The revolution of the rotatable elements 2 need not always be continuous, but it is permissible to adjust the rotational speed according to the degree of imperfection of the glass being drawn which is caused by the devitrification stones. Alternatively, the elements may be driven intermittently, if required.

As to the thickness of the sheet glass being formed, adjustment is possible only within certain limits which are governed by the corelation between the mass velocity of the molten glass being drawn and the operating temperature.

For example, in the conventional Fourcault process, the mass velocity and drawing temperature are varied over a fairly wide range by adjustment of the depth of the debiteuse with respect to the level of the molten glass bath.

In the novel glass drawing process according to this invention, the mass velocity of the molten glass may be altered in a substantial measure within a limited drawing temperature range by varying the shape, for example, the diameter and length, of the rotatable elements and the center-to-center distance between the two elements. However, such operations under high temperature conditions are beset with much trouble and difficulty and replacement of the rotatable elements with new ones also causes much inconvenience. Our further studies led to the findings that have helped overcome those disadvantages.

Thus, in regard to the relation of the depth of submersion of the lowest ends of rotatable elements with respect to the level of molten glass, the width of the slit and the mass velocity of the sheet glass being drawn, it has been found that a drop in the depth of submersion of, for example, 10 millimeters causes an increase of about 15 to 20 percent in mass velocity. In addition, it has also been found that an increase of 10 millimeters in the width of the slit results in an increase of about 8 to 12 percent in mass velocity.

Our study of possible means of varying substantially the depth of submersion or the width of the slit without upsetting the drive axes of the rotatable elements or an exchange of the elements led to the finding that the desired results can be attained by employing a pair of rotatable elements of eccentric configurations.

Figure 4A:
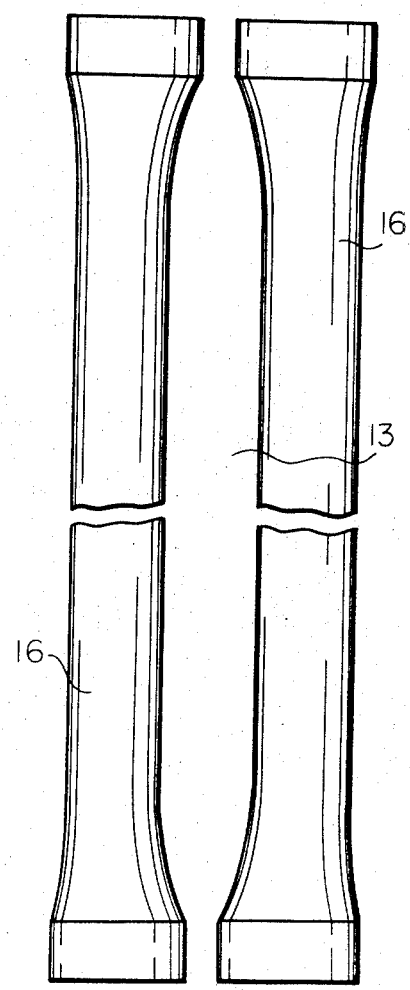
FIG. 4(a) is a plan view showing another pair of rotatable elements which also embodies the principles of this invention.

FIGS. 4(a) and (b) show another pair of rotatable elements 16 embodying the principles of the invention, as viewed at certain angles of rotation. As will be seen from those drawings, the cross-sectional shape of each of the rotatable elements is circular, but the line interconnecting the centers 18 of such cross-sectional circles in the general direction of element elongation is not straight but curved. Indicated by reference numeral 17 is an axis of rotation. Hereinafter, rotatable, asymmetrical elements having such configurations will be called "eccentric" rotatable elements.

Similar beneficial results may also be achieved by installing a pair of non-eccentric rotatable elements like those shown in FIG. 2, instead of such eccentric rotatable elements, in eccentric positions. Taking the rotatable elements of FIG. 2 as an example, those elements may be supported in positions slightly set off from their axes of revolution.

It is also possible to vary the mass velocity by adopting an elliptical sectional shape for the rotatable elements.

The rotatable elements can generally be made of a non-metallic refractory material such as, for example, clay or graphite, or of a heat-resisting metal such as, for example, stainless steel or platinum, or may be platinum-covered castings. In addition to those materials, the elements may be made of any material that is used in the fabrication of the conventional debiteuse. In the actual production of sheet glass, partly because the rotational speed of the rotatable elements is low and partly because glass remains fluid until it has been cooled to fairly low temperatures, the rotatable elements will not be destroyed even if they are made of non-metallic refractory material.

Figure 5:
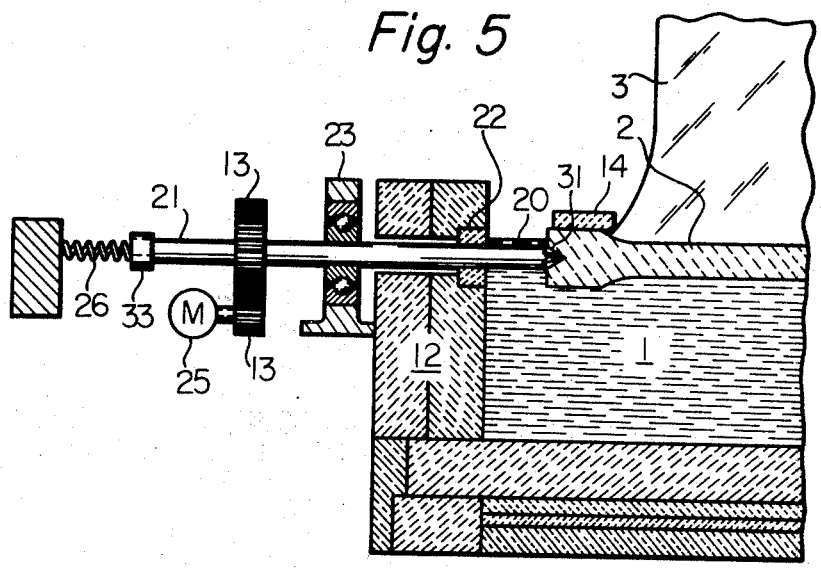
FIG. 5 is a sectional elevation showing the drive and bearing means associated with either one of the rotatable elements illustrated in FIG. 2 or 4.

FIG. 5 illustrates the bearing and drive components which are associated with the rotation of the pair of rotatable elements to be employed according to this invention.

The rotatable elements 2 are supported by spindles 21 made of a special heat-resisting alloy which are located in predetermined positions below the level 20 of the molten glass bath 1.

Indicated by reference numeral 22 is a bearing which is made of a special heat-resisting alloy, such as a high-grade stainless steel.

Figure 6:
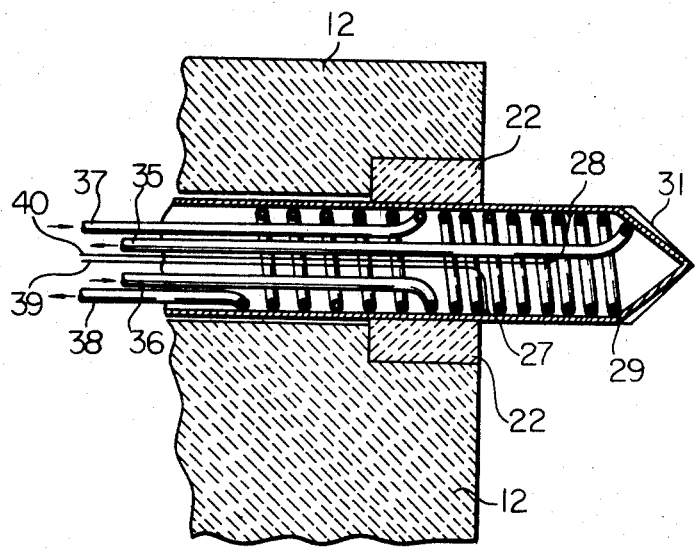
FIG. 6 is a sectional elevation showing the internal structure of the spindle of the drive mechanism illustrated in FIG. 5 on a larger scale.

Each of the rotatable drawing elements 2 is driven from a drive source which may be an electric motor 25. The electric motor 25 is connected through a gearing 13' to a spindle 21 whose end 31 is in frictional engagement with one end of the element 2. A spring 26 engages the other end 33 of the spindle so that the end 31 is constantly pressed against the corresponding end of the rotatable element 2. As illustrated in FIG. 6, the spindle is of hollow construction and provided in the bore or internal space with cooling water piping 29 and thermocouples 27 and 28. The spindle end 33 is provided with a rotary joint through which said cooling water piping and thermocouple means are connected to a cooling water source and temperature indicator means, respectively, which are outside of the equipment and not shown. The end 31 of spindle 21 is formed, for example, in the manner of a ribbed cone to provide the required frictional engagement between the rotatable element 2 and spindle 21, it being understood that, insofar as the necessary frictional force is attained, the end 21 may be of any configuration. A cooling medium such as, for example, water, air or other fluid circulates through two sets of pipes 35 and 36, 37 and 38 in the directions indicated by arrow marks (FIG. 6), whereby the spindle is cooled. In the working example illustrated and hereinbefore described, the forward part of each spindle 21 is partitioned into two sections so that each part may be cooled independently for an improved cooling effect.

It is understood that, to ensure a smooth revolution of the spindle 21, an electrical heating coil may be embedded in or near the bearing 22 in the refractory block 12. A similar result may be achieved by providing such an electrical heating coil inside the spindle.

What is claimed is:

1. In a method of producing sheet glass by drawing molten glass upward in the form of a ribbon from a bath of molten glass, the improvement which comprises:
   (a) drawing said glass at a first speed speed through an elongated slit defined by and between two rotatable elements partly immersed in said bath; and
   (b) rotating said elements about respective axes extending in the direction of elongation of said slit during said drawing in respective peripheral directions upward and outward with respect to said slit at a peripheral second speed,
      (1) said second speed being very much smaller than said first speed and small enough to permit a devitrification stone formed on a portion of the surface of one of said elements in said slit to move from said portion into said bath before said portion again enters said slit,
      (2) such that said elements function as a substantially stationary debiteuse.

2. In a method as set forth in claim 1, said second speed being between about 0.1 millimeter and 5 millimeters per day as measured at the axial ends of said elements.

3. A sheet glass forming apparatus comprising:
   (a) a drawing chamber adapted to contain a bath of molten glass;
   (b) two elongated elements mounted in said chamber for rotation about respective longitudinal, horizontally extending axes while partly immersed in said bath,
      (1) said elements bounding therebetween an axially elongated slit open downward toward said bath and upward,
      (2) respective axially central portions of said elements defining parallel, longitudinal sides of said slit, and the axially terminal portions of said elements defining two axially terminal parts of said slit converging in a direction away from said central portion;
   (c) drawing means for drawing a ribbon of said glass from said bath through said slit; and
   (d) drive means for rotating said elements about said axis thereof.

4. An apparatus as set forth in claim 3, further comprising cooling means disposed adjacent said ribbon for cooling and setting the same.

5. An apparatus as set forth in claim 3, wherein said elements are of circular cross section, said cross section being smallest in said axially central portions of said elements and increasing in said axially terminal portions in a direction away from said central portion.

6. An apparatus according to claim 5, wherein the sectional configuration of each of said elements is set off from its axis of rotation in such a manner that the eccentricity of the element increases towards the center of its length.

References Cited

UNITED STATES PATENTS

| | | | |
|---|---|---|---|
| 1,701,165 | 2/1929 | Swope | 65—198 |
| 1,807,873 | 6/1931 | Reece et al. | 65—198 X |
| 1,608,644 | 11/1926 | Black | 65—185 |
| 2,243,149 | 5/1941 | Despret | 65—185 X |

ARTHUR D. KELLOGG, Primary Examiner

U.S. Cl. X.R.

65—198, 199, 338, 344

UNITED STATES PATENT OFFICE
CERTIFICATE OF CORRECTION

Patent No. 3,740,208　　　　　　　　　Dated June 19, 1973

Inventor(s) SHIRO TAKAHASHI ET AL

It is certified that error appears in the above-identified patent and that said Letters Patent are hereby corrected as shown below:

In the heading, after "44/88,392" and before "Int.Cl.C03b 15/06" insert -- Japan, September 22, 1970, 82,548/1970 --.

Signed and sealed this 12th day of March 1974.

(SEAL)
Attest:

EDWARD M. FLETCHER, JR.　　　　　C. MARSHALL DANN
Attesting Officer　　　　　　　　Commissioner of Patents